(12) United States Patent
Hagiwara

(10) Patent No.: US 6,707,782 B1
(45) Date of Patent: Mar. 16, 2004

(54) INFORMATION RECORDING/READING APPARATUS HAVING ADJUSTABLE STOPPER

(75) Inventor: Hiroyuki Hagiwara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 344 days.

(21) Appl. No.: 09/668,375

(22) Filed: Sep. 25, 2000

(30) Foreign Application Priority Data

Sep. 29, 1999 (JP) .......................................... 11-275495

(51) Int. Cl.[7] .............................................. G11B 25/04
(52) U.S. Cl. ..................................................... 369/215
(58) Field of Search ................................ 369/215, 266, 369/44.32, 75.2, 77.1; 360/99.09, 99.02, 99.01, 99.06, 99.08, 99.03, 99.04, 98.07, 254.2, 254.4, 254.5, 256.6, 254.1, 254.3, 254.6, 97.01, 294.4, 98.01, 98.02

(56) References Cited

U.S. PATENT DOCUMENTS

| | | | | |
|---|---|---|---|---|
| 4,885,733 A | * | 12/1989 | Tsuboi ..................... | 369/44.32 |
| 5,317,464 A | * | 5/1994 | Witt et al. ................ | 360/99.08 |
| 5,418,665 A | * | 5/1995 | Kitano et al. ............ | 360/97.01 |
| 5,654,852 A | * | 8/1997 | Kitano et al. ............ | 360/254.1 |
| 5,798,999 A | * | 8/1998 | Labinsky, deceased et al. .......................... | 369/266 |
| 5,912,786 A | * | 6/1999 | Nicklos et al. .......... | 360/99.09 |
| 5,930,066 A | | 7/1999 | Ishizsuka et al. ........ | 360/77.03 |
| 6,169,720 B1 | * | 1/2001 | Kamemura et al. ........ | 369/75.2 |
| 6,327,120 B1 | * | 12/2001 | Koganezawa et al. ... | 360/294.4 |

* cited by examiner

Primary Examiner—Tianjie Chen
(74) Attorney, Agent, or Firm—Fitzpatrick, Cella, Harper & Scinto

(57) ABSTRACT

An information recording and/or reading apparatus has a base plate, a spindle motor for rotating a disk by the output shaft perpendicular to the base plate, a rotary alignment control device for determining the rotation position of a recording/reading head of a head unit about a rotary alignment axis parallel to the output shaft of the spindle motor, a linear movement guide extending parallel to the rotary alignment axis, and a support mechanism for supporting the rotary alignment control device to be reciprocally movable along the linear movement guide. An information recording and/or reading apparatus allows very easy exchange of a recording/reading head and disk, and can avoid troubles such as damage to the recording/reading head and disk during exchange.

1 Claim, 10 Drawing Sheets

INFORMATION RECORDING/READING APPARATUS HAVING ADJUSTABLE STOPPER

BACKGROUND OF THE INVENTION

1. Field of the Invention

The present invention relates to an information recording and/or reading apparatus suitably used in a magnetic/electrical characteristic inspection device for a servo track writer of a hard disk drive, especially, a master servo writer for simultaneously servo-writing a plurality of hard disks, a pre-servo writer for servo-writing outside a drive, a head, a head gimbal assembly, and a head stack assembly, and a magnetic/electrical characteristic inspection device for a hard disk itself, and is also suitably used in inspection and manufacturing apparatuses of an optical or magnetooptical recording head and an optical or magnetooptical recording disk.

2. Related Background Art

FIG. 13 shows the arrangement of a conventional information recording/reading apparatus. A spindle motor 102 for rotating a disk 103 is fixed on a base 101. A recording/reading head 110 is attached to the distal end of a rotation shaft (not shown) of a rotary alignment control device 107 via a head fixing jig. The rotary alignment control device 107 is disposed on an X-stage including a stationary portion 104 and a movable stage 105 arranged on the base 101, and can be driven in the X-direction (the directions of an arrow in FIG. 13).

In this prior art, two rotary alignment control devices 107 are provided to a single spindle motor 102.

By moving the movable stage 105, the distance between the center of the disk and the center of rotation of the head can be adjusted to an arbitrary spacing. Upon exchanging a disk, the two rotary alignment control devices 107 move in a direction away from the disk 103 and spindle motor 102.

However, in the conventional information recording/reading apparatus, it is difficult to exchange the recording/reading head.

SUMMARY OF THE INVENTION

The present invention has been made in consideration of the unsolved problems of the prior art, and has as its object to provide an information recording/reading apparatus which allows very easy exchange of a recording/reading head and disk, and can avoid troubles such as damage to the recording/reading head and disk during exchange.

In order to achieve the above object, an information recording/reading apparatus according to the present invention comprises a base plate, a spindle motor for rotating a disk by an output shaft perpendicular to the base plate, a rotary alignment control device for determining a rotation position of a recording/reading head of a head unit about a rotary alignment axis parallel to the output shaft of the spindle motor, a linear movement guide extending parallel to the rotary alignment axis, and a support mechanism for supporting the rotary alignment control device to be reciprocally movable along the linear movement guide.

In further aspect of the invention, the apparatus includes a moving stage which mounts the spindle motor, and a stage driving mechanism for driving the moving stage toward or away from the rotary alignment axis.

An information recording and/or reading apparatus according to the present invention comprises a base plate, a spindle motor for rotating a disk by an output shaft perpendicular to the base plate, a rotary alignment control device for determining a rotation position of a recording/reading head of a head unit about a rotary alignment axis parallel to the output shaft of the spindle motor, a horizontal pivot shaft extending perpendicular to a predetermined plane including the rotary alignment axis, and a support mechanism for supporting the rotary alignment control device to be pivotal about the horizontal pivot shaft.

In further aspect of the invention, the apparatus further includes a moving stage which mounts the spindle motor, and a stage driving mechanism for driving the moving stage toward or away from the rotary alignment axis.

An information recording and/or reading apparatus according to the present invention comprises a base plate, a spindle motor for rotating a disk by an output shaft perpendicular to the base plate, a rotary alignment control device for determining a rotation position of a recording/reading head of a head unit about a rotary alignment axis parallel to the output shaft of the spindle motor, a vertical pivot shaft extending parallel to the rotary alignment axis, and a support mechanism for supporting the rotary alignment control device to be pivotal about the vertical pivot shaft.

In further aspect of the invention, the apparatus further includes a moving stage which mounts the spindle motor, and a stage driving mechanism for driving the moving stage toward or away from the rotary alignment axis.

An information recording and/or reading apparatus according to the present invention comprises a base plate, a spindle motor for rotating a disk by an output shaft perpendicular to the base plate, a rotary alignment control device for determining a rotation position of a recording/reading head of a head unit about a rotary alignment axis parallel to the output shaft of the spindle motor, a moving stage which mounts the spindle motor, a stage driving mechanism for driving the moving stage toward or away from the rotary alignment axis, and a stopper for fixing the moving stage at an arbitrary position on a guide mechanism.

Upon recording/reading by the recording/reading head, the moving stage is driven to bring the spindle motor close to the head unit together with the disk, and is fixed at a position defined by a movable stopper. In this state, the rotary alignment control device determines the rotation position of the recording/reading head, and the spindle motor is then driven to record/reproduce information on/from the disk.

Upon exchanging the recording/reading head or disk, the moving stage is moved backward by the stage driving means to move the spindle motor and disk in a direction away from the head unit.

The disk is changed after the moving stage is moved to a position convenient for disk exchange.

On the other hand, the recording/reading head is exchanged in a state wherein the head unit is moved upward or backward by pivoting the support means that supports the rotary alignment control device about a horizontal or vertical pivot shaft, or moving it upward along the linear movement guide, after the disk and spindle motor are sufficiently separated from the head.

In this way, since the recording/reading head is exchanged while the head unit disposed below the rotary alignment control device is moved upward or to a position behind the device, the recording/reading head can be exchanged very easily, and can be prevented from being damaged by interference with surrounding members during exchange.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
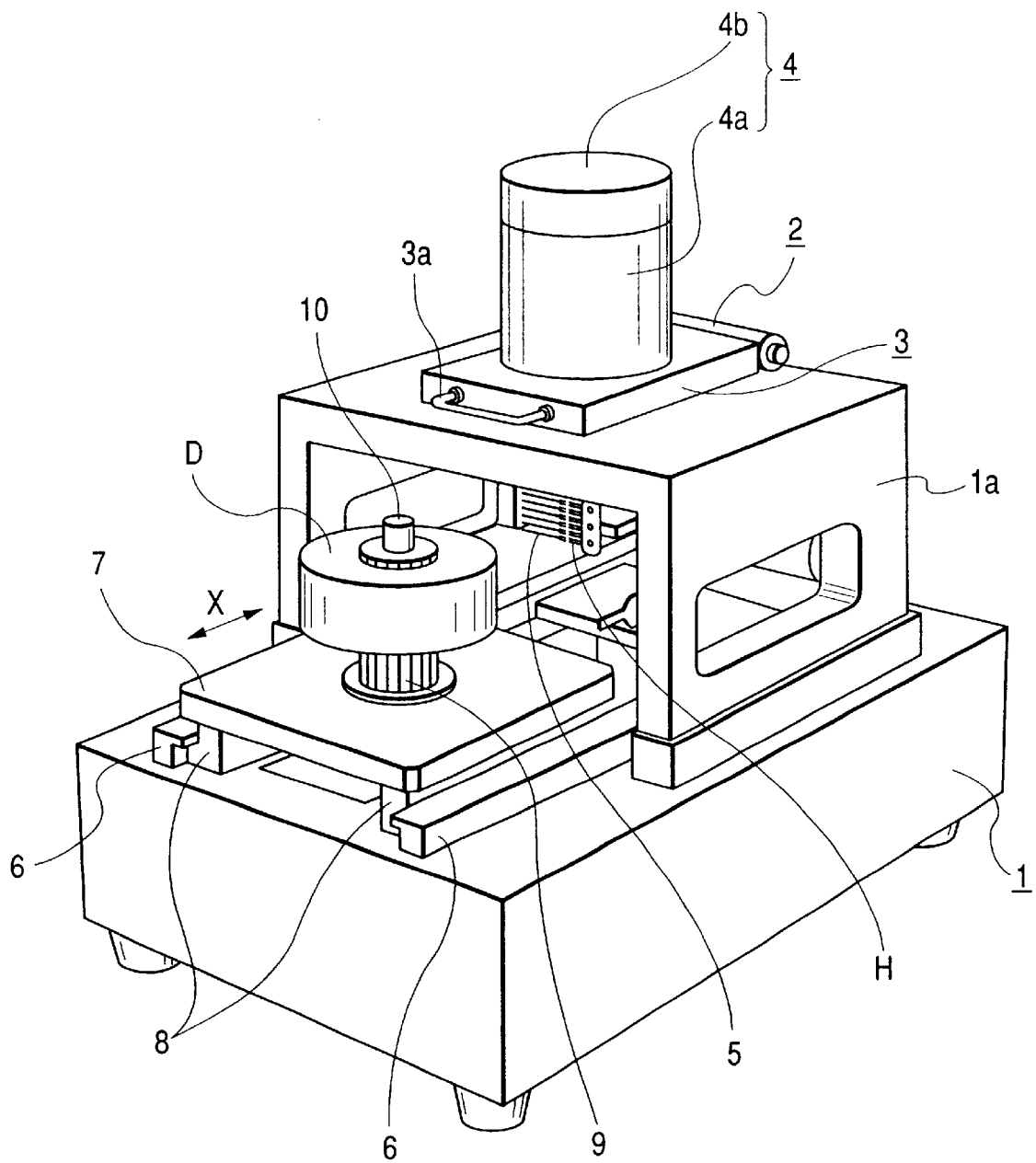
FIG. 1 is a perspective view showing an information recording/reading apparatus according to the first embodiment of the present invention.

FIG. 1 is a perspective view showing an information recording and/or reading apparatus according to the first embodiment. A column 1a stands upright on a base 1 as a base plate made up of stone, metal, or the like, and a plate 3 as a support means which is pivotal about a horizontal pivot shaft by a bearing unit 2 is placed on the column 1a.

The plate 3 supports a rotary alignment control device 4, and supports via that device a head stack unit 5, which includes a head stack of heads H as a plurality of recording/reading heads, and a carriage for holding the head stack. The rotary alignment control device 4 comprises a motor 4a, an optical encoder 4b as a sensor, and the like, and determines the rotation position of the head stack unit 5 about a rotary alignment axis perpendicular to the base 1 under the control of a controller (not shown).

A vacuum suction hole is formed on the plate 3, which is fixed since it sticks by vacuum suction to the upper surface of the column 1a. Upon exchanging a head, when vacuum suction is stopped, and a handle 3a is pulled upward, the head stack unit 5 moves upward via an elongated hole (not shown) formed on the upper wall of the column 1a to expose the heads H, thus facilitating the exchange work.

A pair of stationary guides 6 as guide means extending in the X-direction are fixed to the base 1, and a movable guide 8 located under a moving stage 7 fits in the stationary guides 6, thus allowing reciprocal movements of the moving stage 7 in the X-direction. A vacuum suction hole is formed on the back surface of the movable guide 8, which is fixed to the base 1 after completion of movement. Upon moving the moving stage 7, a negative pressure is switched to a positive pressure to make the moving stage 7 slightly float.

A spindle motor 9 having an output shaft perpendicular to the base 1 is mounted on the moving stage 7, and moves in the X-direction together with the moving stage 7. The output shaft of the spindle motor 9 holds a stack of a plurality of disks D and rotates the disks D. The disks D are fixed to the output shaft by a hub 10.

Figure 2:
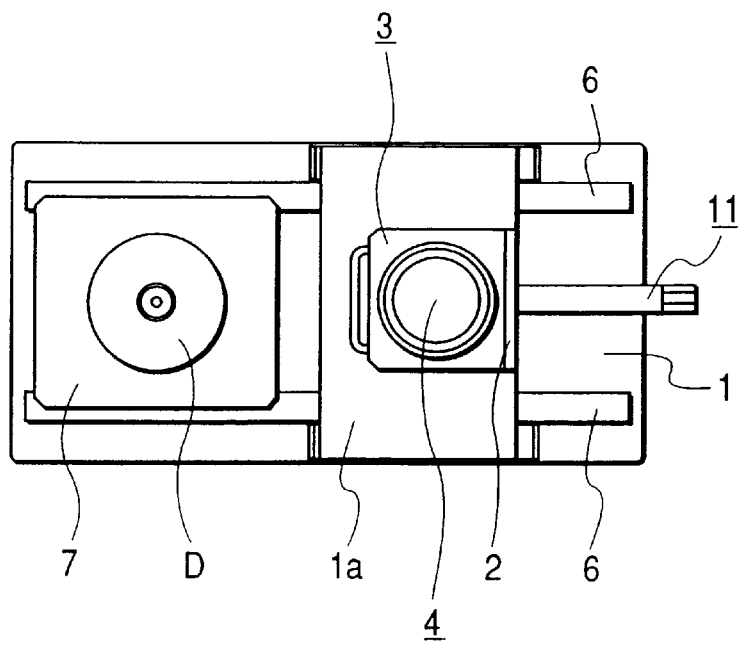
FIG. 2 is a plan view showing the apparatus shown in FIG. 1.
Figure 3:
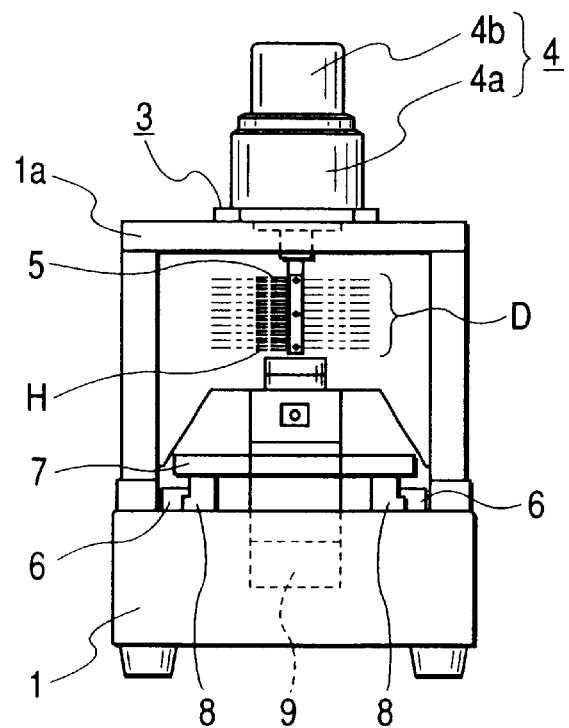
FIG. 3 is a front view showing the apparatus shown in FIG. 1.

FIGS. 2 and 3 are respectively a plan view and front view of the apparatus shown in FIG. 1. The moving stage 7 is driven in the X-direction by an air cylinder 11 as a stage driving means, and can be fixed at an arbitrary position on the stationary guides 6 by adjusting in advance the position of a movable stopper 12 (see FIGS. 4A and 4B) that can be manually adjusted. In this way, the spacing between the spindle motor 9 on the moving stage 7 and rotary alignment control device 4 is determined.

Note that approaching/going-away movements of the moving stage 7 with respect to the rotary alignment control device 4 and head stack unit 5, i.e., its reciprocal movements in a predetermined axial direction (X-direction) can be controlled by a combination of a lead screw and stepping motor or servo motor in place of the air cylinder 11.

Figure 4A:
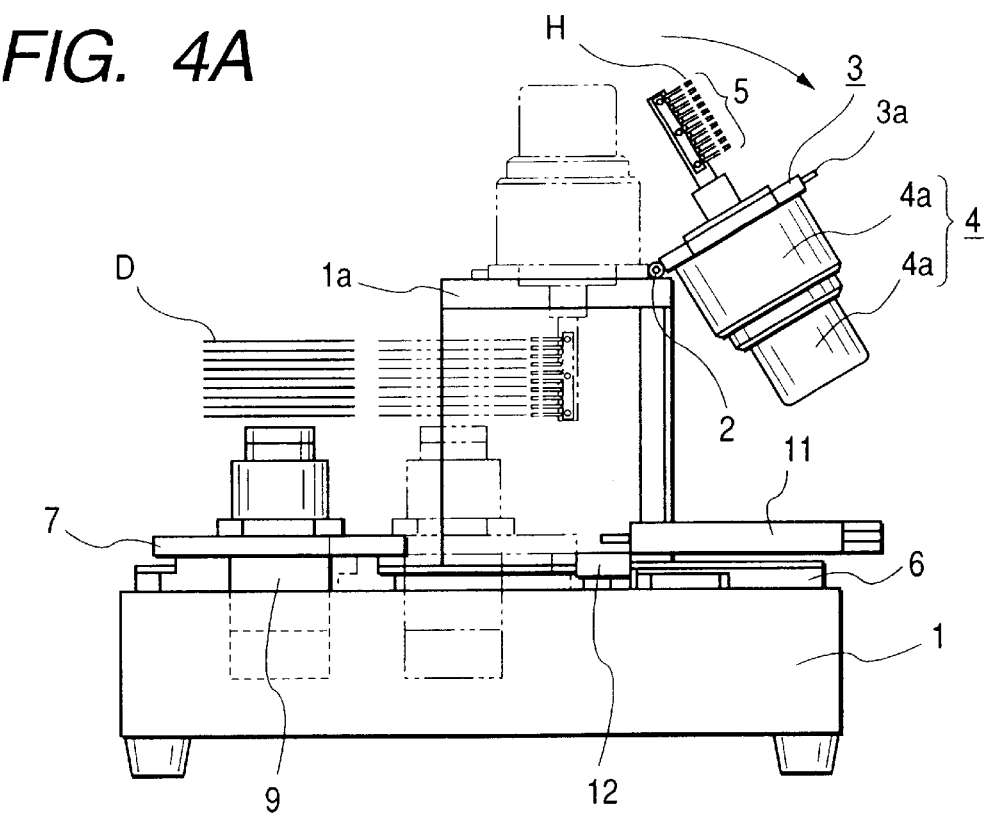
FIGS. 4A and 4B show the apparatus shown in FIG. 1, i.e., are side views respectively showing the head exchange state and information recording/reading state by solid lines.
Figure 4B:
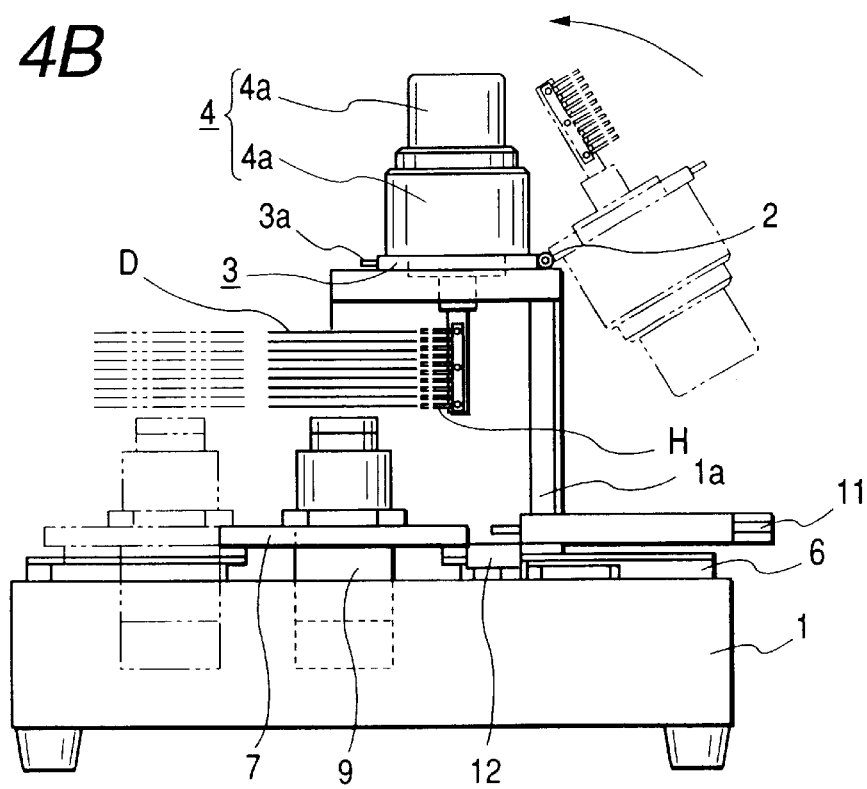

FIGS. 4A and 4B are side views of the apparatus shown in FIG. 1. FIG. 4A shows a state upon exchanging the heads H and FIG. 4B shows a state upon recording/reading by solid lines.

Upon exchanging the heads, the moving stage 7 is moved backward to move the spindle motor 9 that mounts the disks D to a position farthest from the rotary alignment control device 4. In this manner, contact (interference) between the heads H and disks D can be avoided.

Furthermore, the rotary alignment control device 4 and head stack unit 5 are pivoted about the bearing unit 2 as a horizontal pivot shaft perpendicular to the plane including the rotary alignment axis of the rotary alignment control device 4 and the output shaft of the spindle motor 9. By pivoting the plate 3 about the bearing unit 2, the heads H move upward and are exposed.

When the disks D are exchanged, the moving stage 7 alone may be moved, and the rotary alignment control device 4 may be kept set in the use state, as shown in FIG. 4B. That is, the moving stage 7 alone need only be moved to a position best convenient for disk exchange.

Upon recording/reading, the rotary alignment control device 4 is fixed on the column 1a, the spindle motor 9 that mounts the disks D is brought close to the rotary alignment control device 4 and head stack unit 5 together with the moving stage 7, and the stage 7 is fixed at a position where it abuts against the movable stopper 12. Upon rotation of the rotary alignment control device 4, each head H is aligned to an arbitrary track on each disk D.

Figure 5:
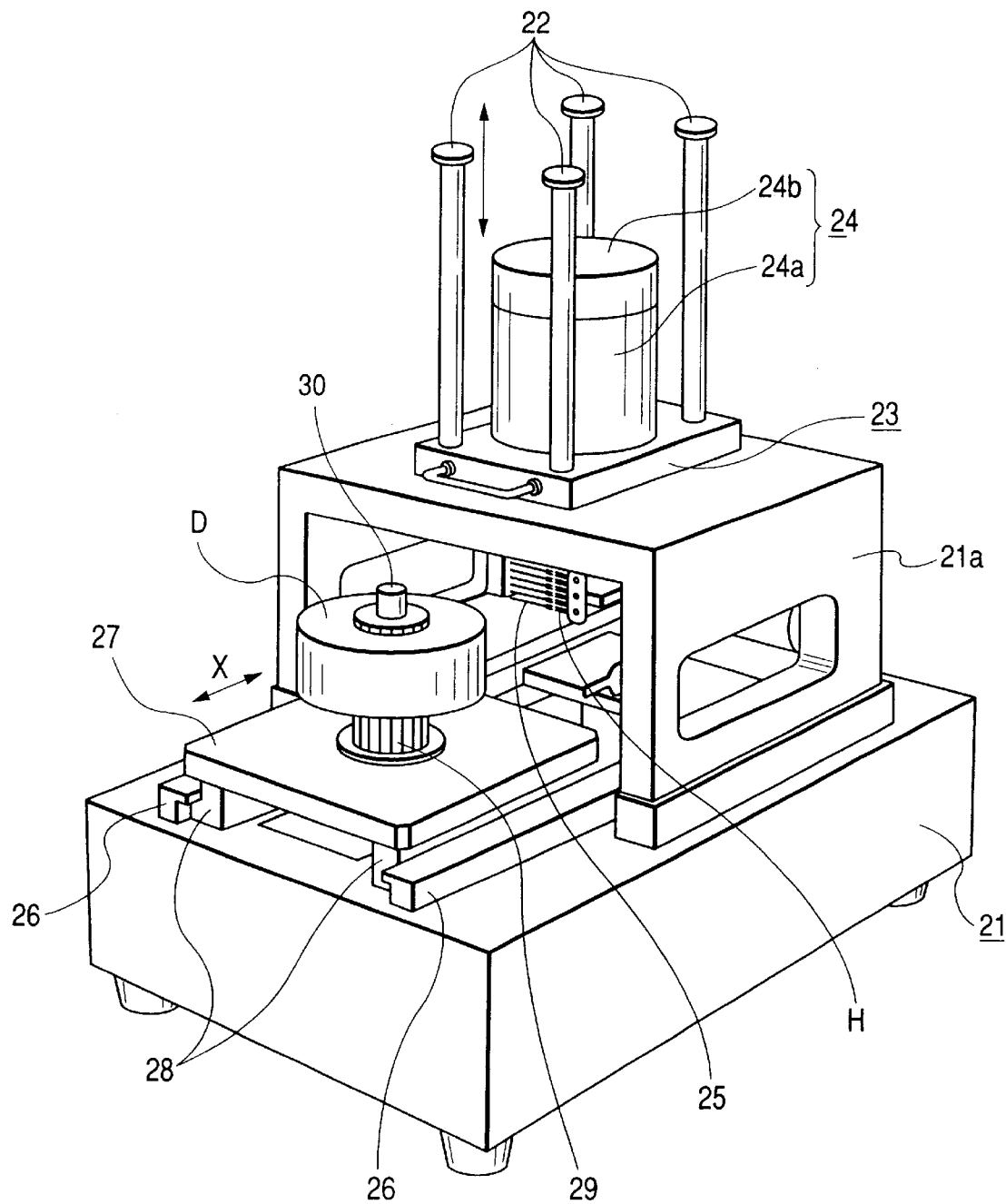
FIG. 5 is a perspective view showing an information recording/reading apparatus according to the second embodiment of the present invention.

FIG. 5 shows the second embodiment. A column 21a stands upright on a base 21 as a base plate made up of stone, metal, or the like, and linear movement guides 22 and a plate 23 as a support means which is vertically movable along these guides are placed on the column 21a.

The plate 23 supports a rotary alignment control device 24, and supports via that device a head stack unit 25, which includes a head stack of heads H as a plurality of recording/reading heads, and a carriage for holding the head stack. The rotary alignment control device 24 comprises a motor 24a, an optical encoder 24b as a sensor, and the like, and determines the rotation position of the head stack unit 25 about a rotary alignment axis perpendicular to the base 21 under the control of a controller (not shown).

A vacuum suction hole is formed on the plate 23, which is fixed since it sticks by vacuum suction to the upper surface of the column 21a. Upon exchanging a head, when vacuum suction is stopped, and the plate 23 is pulled upward by holding a handle or the like, the head stack unit 25 moves upward via an elongated hole (not shown) formed on the upper wall of the column 21a to expose the heads H, thus facilitating the exchange work.

A pair of stationary guides 26 as guide means extending in the X-direction are fixed to the base 21, and a movable guide 28 located under a moving stage 27 fits in the stationary guides 26, thus allowing reciprocal movements of the moving stage 27 in the X-direction. A vacuum suction hole is formed on the back surface of the movable guide 28, which is fixed to the base 21 after completion of movement. Upon moving the moving stage 27, a negative pressure is switched to a positive pressure to make the moving stage 27 slightly float.

A spindle motor 29 having an output shaft perpendicular to the base 21 is mounted on the moving stage 27, and moves in the X-direction together with the moving stage 27. The output shaft of the spindle motor 29 holds a stack of a plurality of disks D and rotates the disks D. The disks D are fixed to the output shaft by a hub 30.

Figure 6:
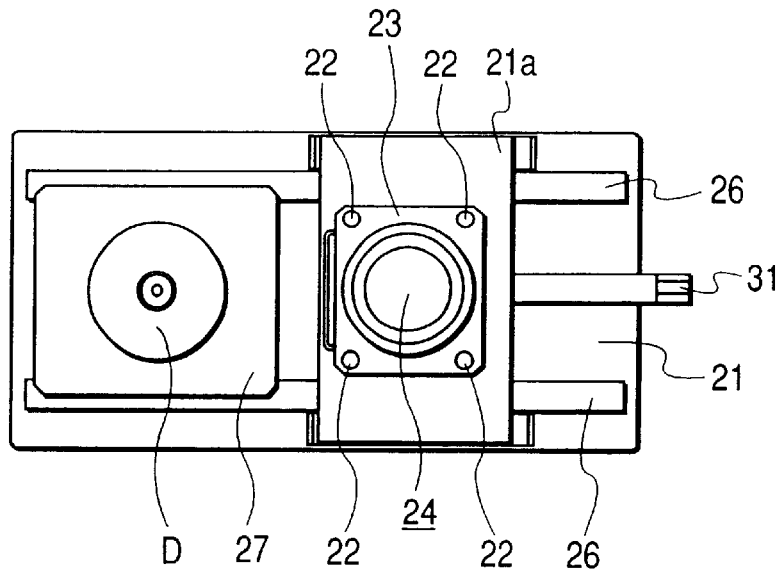
FIG. 6 is a plan view showing the apparatus shown in FIG. 5.
Figure 7:
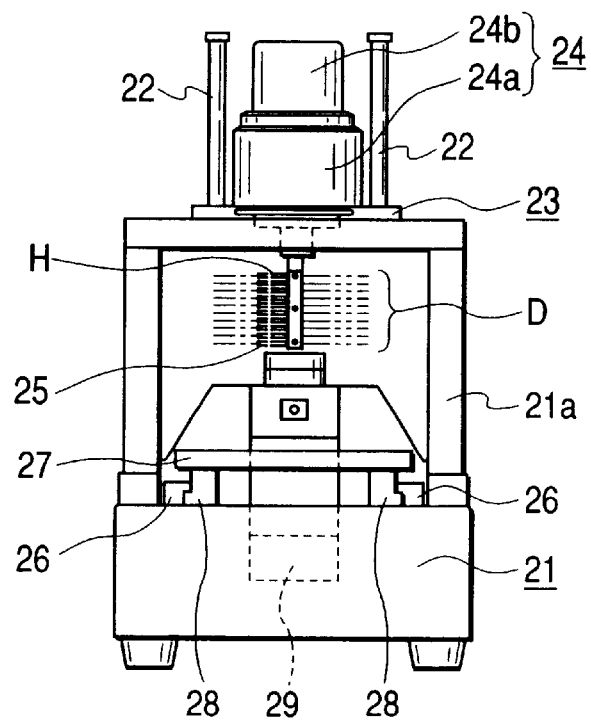
FIG. 7 is a front view showing the apparatus shown in FIG. 5.

FIGS. 6 and 7 are respectively a plan view and front view of the apparatus shown in FIG. 5. The moving stage 27 is driven in the X-direction by an air cylinder 31 as a stage driving means, and can be fixed at an arbitrary position on the stationary guides 26 by adjusting in advance the position of a movable stopper or the like that can be manually adjusted. In this way, the spacing between the spindle motor 29 on the moving stage 27 and rotary alignment control device 24 is determined.

Note that approaching/going-away movements of the moving stage 27 with respect to the rotary alignment control device 24 and head stack unit 25, i.e., its reciprocal movements in a predetermined axial direction (X-direction) can be controlled by a combination of a lead screw and stepping motor or servo motor in place of the air cylinder 31.

Figure 8:
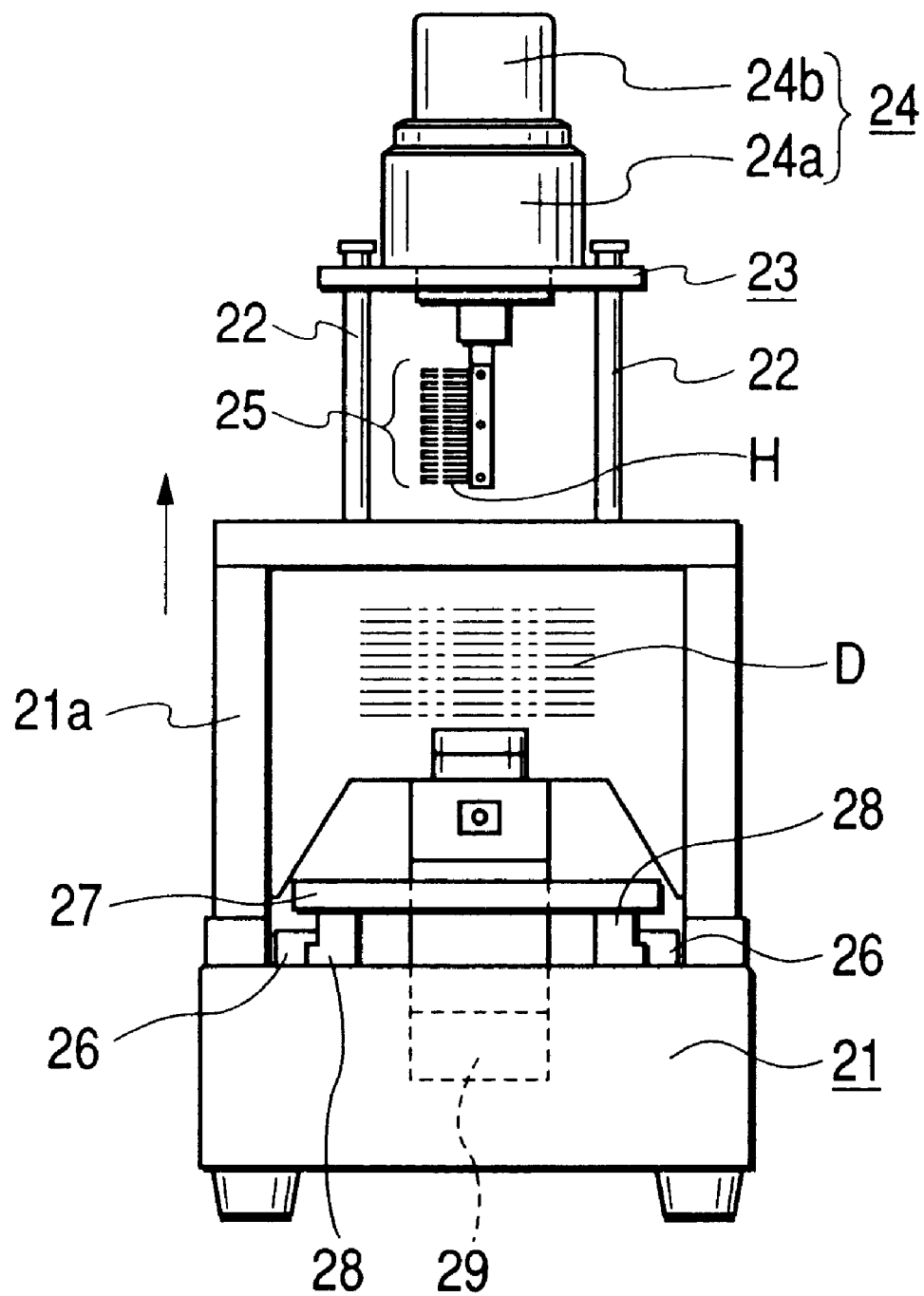
FIG. 8 is a front view showing the head exchange state of the apparatus shown in FIG. 5.

FIG. 8 shows the state upon exchanging the heads H.

Upon exchanging the heads, the moving stage 27 is moved backward to move the spindle motor 29 that mounts the disks D to a position farthest from the rotary alignment control device 24. In this manner, contact (interference) between the heads H and disks D can be avoided. Furthermore, the rotary alignment control device 24 and head stack unit 25 are moved in the direction of an arrow in FIG. 8 to expose the heads H above the column 21a. That is, the plate 23 is moved upward along the linear movement guides 22 which extend parallel to the rotary alignment axis.

When the disks D are exchanged, the moving stage 27 alone may be moved, and the rotary alignment control device 24 may be kept set in the use state, as shown in FIG. 5 or the like.

Upon recording/reading, the rotary alignment control device 24 is fixed on the column 21a, the spindle motor 29 that mounts the disks D is brought close to the rotary alignment control device 24 and head stack unit 25 together with the moving stage 27, and the stage 27 is fixed at a position defined by the movable stopper or the like. Upon rotation of the rotary alignment control device 24, each head H is aligned to an arbitrary track on each disk D.

Figure 9:
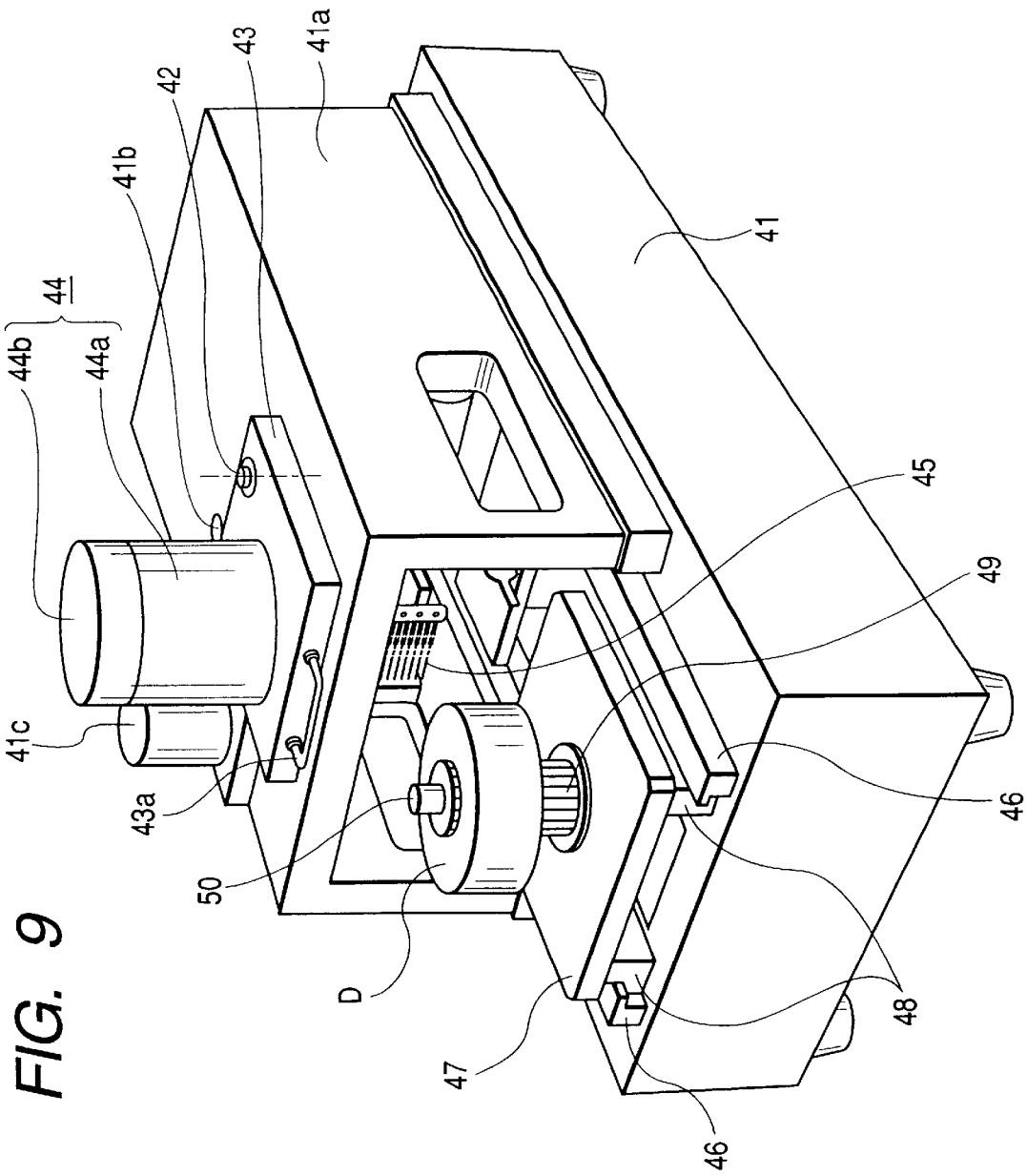
FIG. 9 is a perspective view showing an information recording/reading apparatus according to the third embodiment of the present invention.

FIG. 9 shows the third embodiment. A column 41a stands upright on a base 41 as a base plate made up of stone, metal, or the like, and a plate 43 as a support means which is pivotal about a vertical pivot shaft 42 is placed on the column 41a.

The plate 43 supports a rotary alignment control device 44, and supports via that device a head stack unit 45, which includes a head stack of heads H as a plurality of recording/reading heads, and a carriage for holding the head stack. The rotary alignment control device 44 comprises a motor 44a, an optical encoder 44b as a sensor, and the like, and determines the rotation position of the head stack unit 45 about a rotary alignment axis perpendicular to the base 41 under the control of a controller (not shown).

A vacuum suction hole is formed on the plate 43, which is fixed since it sticks by vacuum suction to the upper surface of the column 41a. Upon exchanging a head, when vacuum suction is stopped, and the plate 43 is pivoted about the vertical pivot shaft 42 by holding a handle 43a, the head stack unit 45 moves backward along an elongated hole 41b formed on the upper wall of the column 41a, thus facilitating the exchange work.

Figure 10:
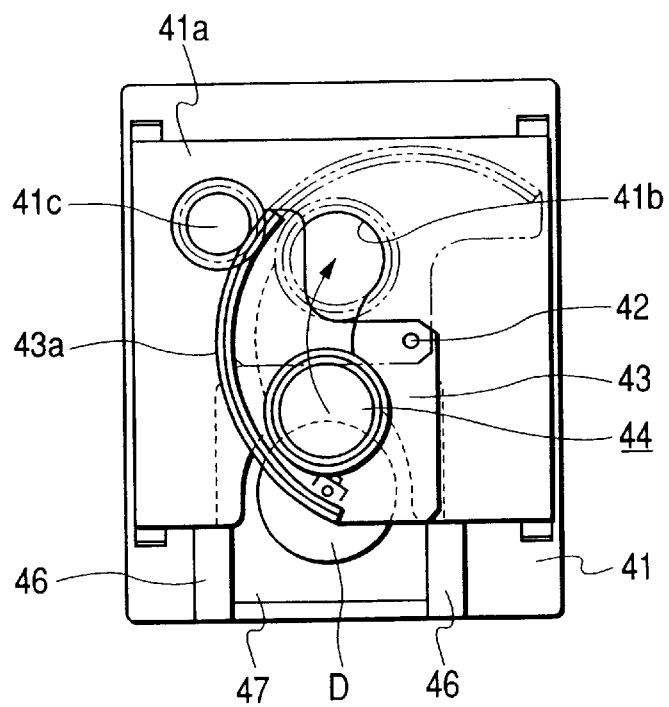
FIG. 10 is a plan view showing the apparatus shown in FIG. 9.

Alternatively, by driving a pinion 41c that meshes with a sector 43a of the plate 43, the plate 43 may be pivoted (see FIG. 10).

A pair of stationary guides 46 as guide means extending in the X-direction are fixed to the base 41, and a movable guide 48 located under a moving stage 47 fits in the stationary guides 46, thus allowing reciprocal movements of the moving stage 47 in the X-direction. A vacuum suction hole is formed on the back surface of the movable guide 48, which is fixed to the base 41 after completion of movement. Upon moving the moving stage 47, a negative pressure is switched to a positive pressure to slightly float the moving stage 47.

A spindle motor 49 having an output shaft perpendicular to the base 41 is mounted on the moving stage 47, and moves in the X-direction together with the moving stage 47. The output shaft of the spindle motor 49 holds a stack of a plurality of disks D and rotates the disks D. The disks D are fixed to the output shaft by a hub 50.

Figure 11:
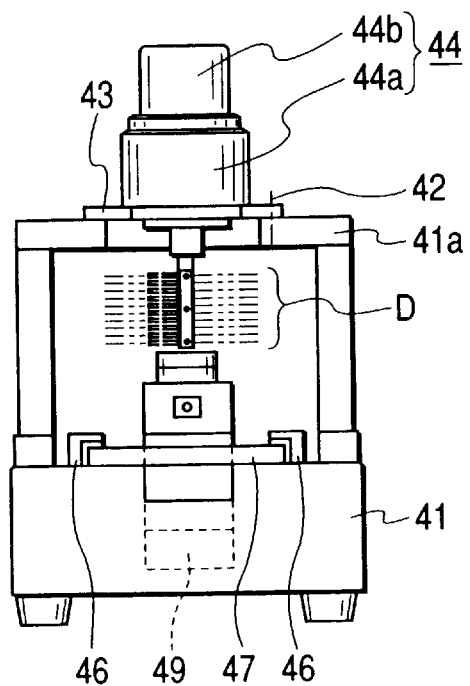
FIG. 11 is a front view showing the apparatus shown in FIG. 9.
Figure 12:
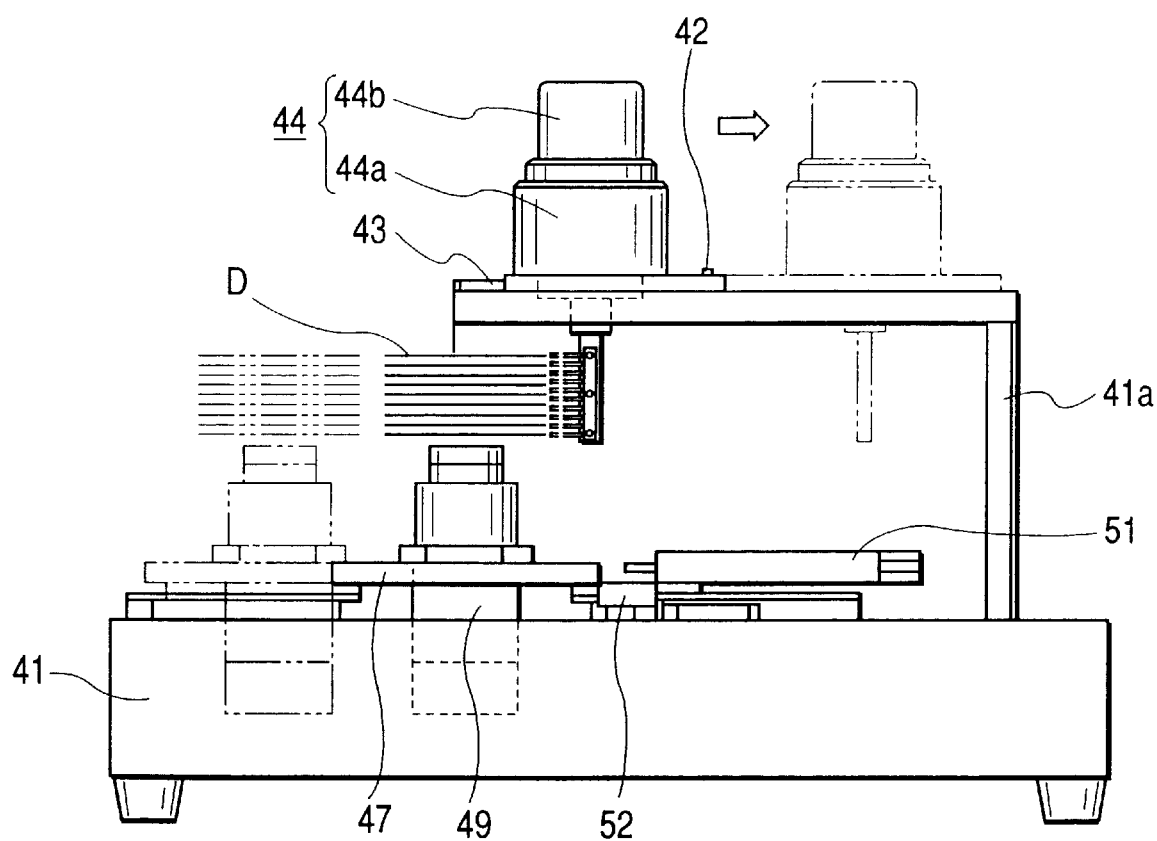
FIG. 12 is a side view showing the apparatus shown in FIG. 9.
Figure 13:
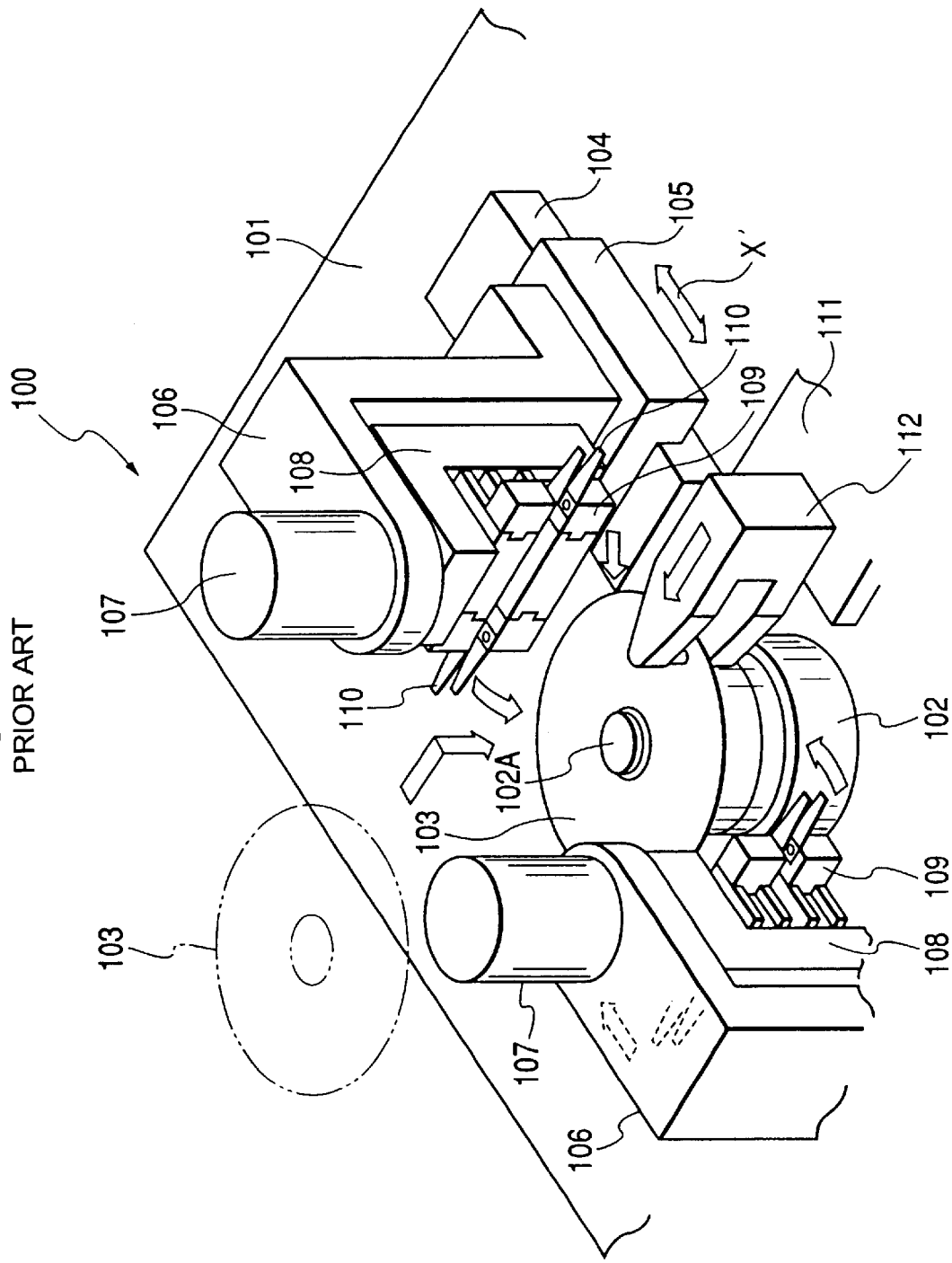
FIG. 13 is a perspective view showing one prior art.

FIGS. 10 to 12 are respectively a plan view, front view, and side view of the apparatus shown in FIG. 9. The moving stage 47 is driven in the X-direction by an air cylinder 51 as a stage driving means, and can be fixed at an arbitrary position on the stationary guides 46 by adjusting in advance the position of a movable stopper 52 that can be manually adjusted. In this way, the spacing between the spindle motor 49 on the moving stage 47 and rotary alignment control device 44 is determined.

Note that approaching/going-away movements of the moving stage 47 with respect to the rotary alignment control device 44 and head stack unit 45, i.e., its reciprocal movements in a predetermined axial direction (X-direction) can be controlled by a combination of a lead screw and stepping motor or servo motor in place of the air cylinder 51.

As shown in FIG. 12, upon exchanging the heads, the moving stage 47 is moved backward to a position indicated by the broken line so as to move the spindle motor 49 that mounts the disks D to a position farthest from the rotary alignment control device 44. In this manner, contact (interference) between the heads H and disks D can be avoided. Furthermore, the rotary alignment control device 44 and head stack unit 45 are pivoted about the vertical pivot shaft 42 which is parallel to the rotary alignment axis of the rotary alignment control device 44, as indicated by an arrow, thus moving them to a position behind the base 41.

When the disks D are exchanged, the moving stage 47 alone may be moved, and the rotary alignment control device 44 may be kept set in the use state, as indicated by the solid line in FIG. 12. That is, the moving stage 47 alone need only be moved to a position best convenient for disk exchange.

Upon recording/reading, the rotary alignment control device 44 is fixed on the column 41a, the spindle motor 49 that mounts the disks D is brought close to the rotary alignment control device 44 and head stack unit 45 together with the moving stage 47, and the stage 47 is fixed at a position where it abuts against the movable stopper 52. Upon rotation of the rotary alignment control device 44, each head H is aligned to an arbitrary track on each disk D.

Since the present invention has the aforementioned arrangement, the recording/reading heads or disks can be exchanged very easily, and damage to the recording/reading heads and disks during exchange can be avoided.

What is claimed is:

1. An information recording and/or reading apparatus comprising:
   a base plate;
   a spindle motor for rotating a disk by an output shaft perpendicular to said base plate;
   a rotary alignment control device for determining a rotation position of a recording/reading head of a head unit about a rotary alignment axis parallel to the output shaft of said spindle motor;
   a moving stage which mounts said spindle motor;
   a stage driving mechanism for driving said moving stage toward or away from the rotary alignment axis; and
   a stopper for fixing said moving stage at an arbitrary position on a guide mechanism so that the position of said spindle motor on the moving stage and the position of said rotary alignment control device are fixed in a predetermined relation.

\* \* \* \* \*

UNITED STATES PATENT AND TRADEMARK OFFICE
CERTIFICATE OF CORRECTION

PATENT NO. : 6,707,782 B1 Page 1 of 1
DATED : March 16, 2004
INVENTOR(S) : Hiroyuki Hagiwara It is certified that error appears in the above-identified patent and that said Letters Patent is hereby corrected as shown below:

<u>Column 1,</u>
Line 61, "In" should read -- In a --.

<u>Column 2,</u>
Lines 9 and 23, "In" should read -- In a --.

Signed and Sealed this

Tenth Day of August, 2004

JON W. DUDAS
*Acting Director of the United States Patent and Trademark Office*